United States Patent
Hörold et al.

(10) Patent No.: US 12,209,175 B2
(45) Date of Patent: Jan. 28, 2025

(54) FLAME RETARDANT-STABILIZER COMBINATION FOR THERMOPLASTIC POLYMERS

(71) Applicant: Clariant International Ltd, Muttenz (CH)

(72) Inventors: Sebastian Hörold, Diedorf (DE); Harald Bauer, Kerpen (DE); Eva Maria Leuschner, Augsburg (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 18/557,438

(22) PCT Filed: Apr. 25, 2022

(86) PCT No.: PCT/EP2022/060835
§ 371 (c)(1),
(2) Date: Oct. 26, 2023

(87) PCT Pub. No.: WO2022/233619
PCT Pub. Date: Nov. 10, 2022

(65) Prior Publication Data
US 2024/0218160 A1    Jul. 4, 2024

(30) Foreign Application Priority Data
May 7, 2021    (EP) .................................. 211712633

(51) Int. Cl.
| | |
|---|---|
| *C08K 5/5313* | (2006.01) |
| *C08K 3/32* | (2006.01) |
| *C08K 5/3492* | (2006.01) |
| *C08K 7/02* | (2006.01) |
| *C08L 67/02* | (2006.01) |
| *C08L 71/02* | (2006.01) |

(52) U.S. Cl.
CPC .............. *C08K 5/5313* (2013.01); *C08K 3/32* (2013.01); *C08K 5/34924* (2013.01); *C08K 7/02* (2013.01); *C08L 67/02* (2013.01); *C08L 71/02* (2013.01); *C08K 2201/014* (2013.01); *C08L 2201/02* (2013.01); *C08L 2203/30* (2013.01)

(58) Field of Classification Search
None
See application file for complete search history.

(56) References Cited

U.S. PATENT DOCUMENTS

| | | |
|---|---|---|
| 4,180,495 A | 12/1979 | Sandler |
| 4,208,321 A | 6/1980 | Sandler |
| 2005/0009941 A1 | 1/2005 | Sicken |
| 2006/0020064 A1 | 1/2006 | Bauer |
| 2013/0190432 A1 * | 7/2013 | Krause ..................... C08K 3/22 524/133 |
| 2016/0355667 A1 * | 12/2016 | Raemakers-Franken .................... C08K 5/34922 |
| 2018/0244899 A1 | 8/2018 | Hoerold |

FOREIGN PATENT DOCUMENTS

| | | |
|---|---|---|
| CN | 107223149 | 9/2017 |
| CN | 108250646 A | 7/2018 |
| CN | 110951113 | 4/2020 |
| CN | 111212871 | 5/2020 |
| DE | 2252258 A | 5/1974 |
| DE | 2447727 A | 4/1976 |
| DE | 19607635 A1 | 9/1997 |
| DE | 19734437 | 2/1999 |
| DE | 19737727 | 7/1999 |
| EP | 0699708 | 3/1996 |
| EP | 1479718 B1 | 4/2014 |
| JP | 2016216463 A | 12/2016 |
| WO | 9739053 | 10/1997 |
| WO | 2012119067 A1 | 9/2012 |
| WO | 2020165018 A1 | 8/2020 |
| WO | WO 2022/024073 * | 2/2022 |
| WO | 2022236322 | 11/2022 |

OTHER PUBLICATIONS

International Search Report issued in App. No. PCT/EP2022/060835, dated Sep. 13, 2022, 3 pages.
Extended European Search Report issued in App. No. EP21172633, dated Nov. 12, 2021, 5 pages.

\* cited by examiner

*Primary Examiner* — Robert T Butcher

(57) ABSTRACT

Described herein is a flame retardant-stabilizer mixture including as a component A, 5% to 95% by weight of aluminium diethylphosphinate (DEPAL) and/or zinc diethylphosphinate (DEPZN); as a component B, 5% to 95% by weight of titanium phosphinates and/or titanyl phosphinates of the formula (I) (DEPTI) in which x is a number from 0 to 1.9; as a component C, 0% to 10% by weight of aluminium phosphite or zinc phosphite of the formula (II), $[HP(\!=\!O)O_2]^{2-}Zn^{2+}$, and formula (III), $[HP(\!=\!O)O_2]^{2-}{}_3 Al^{3+}{}_2$; as a component D, 0% to 30% by weight of a nitrogen-containing synergist and/or of a phosphorus-containing and/or nitrogen-containing flame retardant; as a component E, 0% to 70% by weight of a filler and reinforcer; as a component F, 0% to 3% by weight of an organic phosphonite and/or an organic phosphite and/or mixtures with phenolic antioxidants; and as a component G, 0% to 3% by weight of an ester and/or salt of long-chain aliphatic carboxylic acids (fatty acids) typically having chain lengths of $C_{14}$ to $C_{40}$. The sum total of components A-G is 100% by weight.

(I)

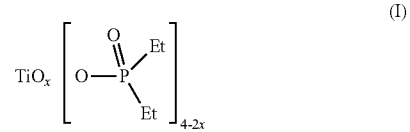

19 Claims, No Drawings

FLAME RETARDANT-STABILIZER COMBINATION FOR THERMOPLASTIC POLYMERS

The invention relates to a novel flame retardant combination for halogen-free thermoplastic polymers using titanium-containing phosphinate flame retardants, and to polymeric moulding compounds and mouldings comprising such flame retardant combinations.

Combustible plastics generally have to be equipped with flame retardants in order to be able to attain the high flame retardancy demands made by the plastics processors and in some cases by the legislator. Preferably—for environmental reasons as well—nonhalogenated flame retardant systems that form only small amounts of smoke gases, if any, are used.

Among these flame retardants, the salts of alkylphosphinic acids (phosphinates) have been found to be particularly effective for thermoplastic polymers (DE-2252258A and DE-2447727A). At first there were descriptions essentially of alkali metal phosphinates and their flame-retardant action in polyester moulding compounds (DE-A-2 252 258) and in polyamides (DE-A-2 447 727) was claimed. Interest later concentrated in particular on zinc salts (U.S. Pat. Nos. 4,180,495; 4,208,321), and more recently on the calcium and aluminium phosphinates (EP-A-0 699 708; DE-A-196 07 635), as what were thought to be the most suitable flame retardants of that type.

In addition, synergistic combinations of phosphinates with particular nitrogen-containing compounds have been found, and these have in many cases been found to have better efficacy as flame retardants than the phosphinates alone (WO 97/39053, and also DE-A-197 34 437 and DE-A-197 37 727).

While the use of flame retardants in polymer resins can considerably reduce inflammability, this can lead to high evolution of smoke when the polymer resins are exposed to heat or flames. Such evolution of smoke should be avoided since it can lead to major damage and also to poisoning resulting in death. Phosphinates are very effective flame retardants, especially for polyamides and polyesters, but the gas phase activity of the phosphinates and the alkyl radicals bonded to the phosphorus atom in the molecule generally lead to increased smoke formation.

It has now been found that, surprisingly, titanium phosphinates and titanyl phosphinates, in combination with aluminium phosphinates or zinc phosphinates and optionally with aluminium phosphite or zinc phosphite and further synergists and additives, have particularly good flame-retardant action in thermoplastic polymers and are notable for very low smoke gas density.

The use of titanium phosphinates and titanyl phosphinates is described in EP 1 479 718 B1. Emphasis is given to the particularly good flame-retardant action of titanium phosphinates and titanyl phosphinates. In glass fibre-reinforced PBT and PA 66, the UL 94 V-0 fire class is achieved with 20% DEPTI or 10% DEPTI and 10% melamine cyanurate. There is no description of the smoke gas density and smoke gas toxicity.

The present invention therefore provides flame retardant-stabilizer mixtures comprising
as component A 5% to 95% by weight of aluminium diethylphosphinate (DEPAL) and/or zinc diethylphosphinate (DEPZN),
as component B 5% to 95% by weight of titanium phosphinates and/or titanyl phosphinates of the formula (I) (DEPTI)

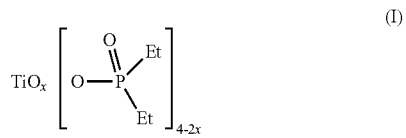

in which x is a number from 0 to 1.9,
as component C 0% to 10% by weight of aluminium phosphite or zinc phosphite of the formula (II) and (III)

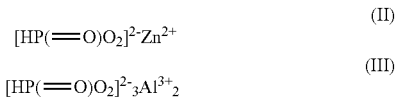

as component D 0% to 30% by weight of a nitrogen-containing synergist and/or of a phosphorus-containing and/or nitrogen-containing flame retardant,
as component E 0% to 70% by weight of a filler and reinforcer,
as component F 0% to 3% by weight of an organic phosphonite and/or an organic phosphite and/or mixtures with phenolic antioxidants,
as component G 0% to 3% by weight of an ester and/or salt of long-chain aliphatic carboxylic acids (fatty acids) typically having chain lengths of $C_{14}$ to $C_{40}$,
where the sum total of the components is always 100% by weight.

The flame retardant-stabilizer combination according to the invention preferably comprises
5% to 95% by weight of component A,
5% to 95% by weight of component B,
0% to 10% by weight of component C,
0% to 20% by weight of component D,
20% to 60% by weight of component E,
0% to 3% by weight of component F and
0% to 2% by weight of component G,
where the sum total of the components is always 100% by weight.

The flame retardant-stabilizer combination according to the invention more preferably comprises
5% to 95% by weight of component A,
5% to 95% by weight of component B,
0% to 10% by weight of component C,
0% to 20% by weight of component D,
20% to 60% by weight of component E,
0% to 3% by weight of component F and
0% to 2% by weight of component G,
where the sum total of the components is always 100% by weight.

The flame retardant-stabilizer combination according to the invention especially comprises
10% to 69% by weight of component A,
10% to 69% by weight of component B,
1% to 20% by weight of component C,
0% to 30% by weight of component D,
20% to 50% by weight of component E,
0% to 3% by weight of component F and
0% to 2% by weight of component G,
where the sum total of the components is always 100% by weight.

Preference is also given to a flame retardant-stabilizer combination according to the invention comprising
- 10% to 67.8% by weight of component A,
- 10% to 40% by weight of component B,
- 1% to 10% by weight of component C,
- 2% to 20% by weight of component D,
- 20% to 60% by weight of component E,
- 0.1% to 3% by weight of component F and
- 0.1% to 2% by weight of component G,
- where the sum total of the components is always 100% by weight.

In a preferred embodiment, the flame retardant-stabilizer combination according to the invention comprises
- 10% to 68.8% by weight of component A,
- 10% to 40% by weight of component B,
- 20% to 50% by weight of component E,
- 0.1% to 3% by weight of component F and
- 0.1% to 2% by weight of component G,
- where the sum total of the components is always 100% by weight.

In another preferred embodiment, the flame retardant-stabilizer combination according to the invention comprises
- 10% to 68.9% by weight of component A,
- 10% to 40% by weight of component B,
- 1% to 30% by weight of component D,
- 20% to 50% by weight of component E and
- 0.1% to 2% by weight of component G,
- where the sum total of the components is always 100% by weight.

In a further preferred embodiment, the flame retardant-stabilizer combination according to the invention comprises
- 10% to 69% by weight of component A,
- 10% to 40% by weight of component B,
- 1% to 20% by weight of component C,
- 0% to 30% by weight of component D and
- 20% to 50% by weight of component E,
- where the sum total of the components is always 100% by weight.

X in formula (I) is preferably 1 to 1.05, such that the ratio of Ti to diethylphosphinate is from 1.9 to 2.

Component C is preferably zinc phosphite, secondary zinc phosphite ($ZnHPO_3$), $Zn(H_2PO_3)_2$, $Zn_{2/3}HPO_3$, zinc phosphite hydrates, zinc pyrophosphite ($ZnH_2P_2O_5$), basic zinc phosphite of the formula

$$Zn_{1+x}HPO_3(OH)_{2x}$$

with x=0 to 0.25 and/or sodium zinc phosphites of the formula

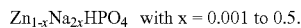

$$Zn_{1-x}Na_{2x}HPO_4 \text{ with } x = 0.001 \text{ to } 0.5.$$

Components C are more preferably zinc salts of phosphorous acid (also called zinc phosphites here) with CAS numbers 14332-59-3, 114332-59-3, 1431544-62-5, 14902-88-6, 52385-12-3 and 51728-08-6.

Component C preferably comprises aluminium phosphite [$Al(H_2PO_3)_3$], secondary aluminium phosphite [$Al_2(HPO_3)_3$], basic aluminium phosphite [$Al(OH)(H_2PO_3)_2 \cdot 2aq$], aluminium phosphite tetrahydrate [$Al_2(HPO_3)_3 \cdot 4aq$], aluminium phosphonate, $Al_7(HPO_3)_9(OH)_6$ (hexane-1,6-diamine)$_{1.5} \cdot 12H_2O$, $Al_2(HPO_3)_3 \cdot xAl_2O_3 \cdot nH_2O$ where x=2.27-1 and/or $Al_4H_6P_{16}O_{18}$, and aluminium phosphites of the formulae (IV), (V), and/or (VI), where

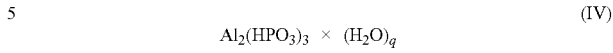

$$Al_2(HPO_3)_3 \times (H_2O)_q \qquad (IV)$$

in which
q is 0 to 4,

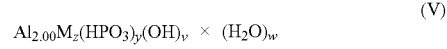

$$Al_{2.00}M_z(HPO_3)_y(OH)_v \times (H_2O)_w \qquad (V)$$

in which
M represents alkali metal ions
z is 0.01 to 1.5
y is 2.63 to 3.5
v is 0 to 2, and
w is 0 to 4,

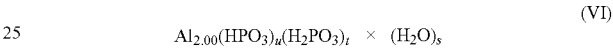

$$Al_{2.00}(HPO_3)_u(H_2PO_3)_t \times (H_2O)_s \qquad (VI)$$

in which
u is 2 to 2.99,
t is 2 to 0.01, and
s is 0 to 4,
and/or comprises mixtures of aluminium phosphite of the formula (IV) with sparingly soluble aluminium salts and nitrogen-free extraneous ions, mixtures of aluminium phosphite of the formula (VI) with aluminium salts, aluminium phosphite [$Al(H_2PO_3)_3$], secondary aluminium phosphite [$Al_2(HPO_3)_3$], basic aluminium phosphite [$Al(OH)(H_2PO_3)_2 \cdot 2aq$], aluminium phosphite tetrahydrate [$Al_2(HPO_3)_3 \cdot 4aq$], aluminium phosphonate, $Al_7(HPO_3)_9(OH)_6$ (hexane-1,6-diamine)$_{1.5} \cdot 12H_2O$, $Al_2(HPO_3)_3 \cdot xAl_2O_3 \cdot nH_2O$ with x=2.27-1 and/or $Al_4H_6P_{16}O_{18}$.

The invention also encompasses the use of a flame retardant-stabilizer combination according to one or more of Claims 1 to 12 as flame retardant in or as flame retardant for clearcoats and intumescent coatings, in or as flame retardant for wood and other cellulosic products, in or as reactive and/or nonreactive flame retardant for polymers, for production of flame-retardant polymer moulding compounds, for production of flame-retardant polymer mouldings and/or for rendering polyester and pure and blended cellulose fabrics flame-retardant by impregnation, and/or as synergist and/or as synergist in further flame retardant mixtures.

The invention also relates to flame-retardant thermoplastic or thermoset polymer moulding compounds or polymer mouldings, films, filaments and/or fibres comprising 2% to 50% by weight of flame retardant-stabilizer combination according to one or more of Claims 1 to 9, 50% to 98% by weight of thermoplastic or thermoset polymer or mixtures thereof, 0% to 50% by weight of additives and 0% to 60% by weight of filler or reinforcing materials, where the sum of the components is 100% by weight.

Preference is given to flame-retardant thermoplastic or thermoset polymer moulding compound or polymer mouldings, films, filaments and/or fibres comprising 7% to 30% by weight of flame retardant-stabilizer combination according to one or more of Claims 1 to 12, 30% to 92% by weight of thermoplastic or thermoset polymer or mixtures thereof, 1% to 30% by weight of additives and 0% to 40% by weight of filler or reinforcing materials, where the sum of the components is 100% by weight.

Preference is given to flame-retardant thermoplastic or thermoset polymer moulding compounds or polymer mouldings, films, filaments and/or fibres comprising flame retardant mixtures according to one or more of Claims 1 to 11, characterized in that the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

The polymers in the flame-retardant thermoplastic or thermoset polymer moulding compound or polymer mouldings, films, filaments and/or fibres comprising flame retardant mixtures according to one or more of Claims 1 to 12 are especially thermoplastic polymers of the nylon-6 or nylon-6,6 type, semiaromatic polyamides, and polyesters of the polybutylene terephthalate (PBT), polycyclohexylenedimethylene terephthalate (PCT) and/or polyethylene terephthalate (PET) type.

The additives are preferably antioxidants, UV absorbers, light stabilizers, metal deactivators, peroxide-destroying compounds, polyamide stabilizers, basic costabilizers, nucleating agents, further flame retardants and/or other additions.

Component E preferably comprises fillers and reinforcers such as calcium carbonate, silicates, glass fibres, asbestos, talc, kaolin, mica, barium sulfate, metal oxides and hydroxides, carbon black, graphite and/or other suitable substances.

The flame-retardant thermoplastic or thermoset polymer moulding compounds or polymer mouldings, films, filaments and/or fibres according to one or more of Claims 14 to 19 are preferably used in or for plug connectors, current-bearing components in power distributors (residual current protection), circuit boards, potting compounds, power connectors, circuit breakers, lamp housings, LED lamp housings, capacitor housings, coil elements, ventilators, grounding contacts, plugs, in/on printed circuit boards, housings for plugs, cables, flexible circuit boards, charging cables, motor covers, textile coatings and other products.

Preferably suitable components C are aluminium phosphites having CAS numbers 119103-85-4, 220689-59-8, 56287-23-1, 156024-71-4, 71449-76-8 and 15099-32-8.

Particular preference is given to the aluminium phosphites having CAS number [CAS 56287-23-1].

Preferably suitable components C are also mixtures of aluminium phosphite and aluminium hydroxide having a composition of 5-95% by weight of $Al_2(HPO_3)_3 \cdot nH_2O$ and 95-5% by weight of $Al(OH)_3$, more preferably 10-90% by weight of $Al_2(HPO_3)_3 \cdot nH_2O$ and 90-10% by weight of $Al(OH)_3$, most preferably 35-65% by weight of $Al_2(HPO_3)_3 \cdot nH_2O$ and 65-35% by weight of $Al(OH)_3$, and in each case n=0 to 4.

The aforementioned aluminium phosphites preferably have particle sizes of 0.2 to 100 μm.

Component D preferably comprises condensation products of melamine and/or reaction products of melamine with polyphosphoric acid and/or reaction products of condensation products of melamine with polyphosphoric acid or mixtures thereof; and/or melamine cyanurate.

Component D more preferably comprises melem, melam, melon, dimelamine pyrophosphate, melamine polyphosphate, melem polyphosphate, melam polyphosphate, melon polyphosphate and/or mixed poly salts thereof.

Particular preference is given to using, as component D, Melapur® 200 (from BASF, D) melamine polyphosphate (referred to as MPP), Melapur® MC50 (from BASF, D) melamine cyanurate (referred to as MC), Delflam® 20 (from Delamin Ltd., UK) melem, and other products.

The fillers and reinforcers (component E) are preferably calcium carbonate, silicates, glass fibres, wollastonite, talc, kaolin, mica, barium sulfate, metal oxides and hydroxides, carbon black, graphite and/or other suitable substances.

Component E more preferably comprises glass fibres.

Suitable components F are, for instance, mixtures of Irgafos® 168/Irganox® 1098 1:1 for nylon-6,6 and Ultranox® 626/Irganox® 1076 1:1 for PBT.

A suitable component G is, for instance, Licomont® CaV 102 from Clariant Produkte (Deutschland) GmbH (a Ca salt of montan wax acid).

Examples of suitable antioxidants as a constituent of component F are alkylated monophenols, for example 2,6-di-tert-butyl-4-methylphenol;

1.2 alkylthiomethylphenols, for example 2,4-dioctylthiomethyl-6-tert-butylphenol; hydroquinones and alkylated hydroquinones, for example 2,6-di-tert-butyl-4-methoxyphenol; tocopherols, for example α-tocopherol, β-tocopherol, γ-tocopherol, δ-tocopherol, and mixtures thereof (vitamin E); hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide; alkylidenebisphenols, for example 2,2'-methylenebis(6-tert-butyl-4-methylphenol);

O-, N- and S-benzyl compounds, e.g. 3,5,3',5'-tetra-tert-butyl-4,4'-dihydroxydibenzyl ether; hydroxybenzylated malonates, e.g. dioctadecyl 2,2-bis(3,5-di-tert-butyl-2-hydroxybenzyl)malonate; hydroxybenzyl aromatics, e.g. 1,3,5-tris(3,5-di-tert-butyl)-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol; triazine compounds, e.g. 2,4-bisoctylmercapto-6-(3,5-di-tert-butyl-4-hydroxyanilino)-1,3,5-triazine; benzyl phosphonates, e.g. dimethyl 2,5-di-tert-butyl-4-hydroxybenzylphosphonate; acylaminophenols, 4-hydroxylauramide, 4-hydroxystearanilide, N-(3,5-di-tert-butyl-4-hydroxyphenyl)carbamic acid octyl ester; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl)propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Examples of suitable UV absorbers and light stabilizers as further additives are 2-(2'-hydroxyphenyl)benzotriazoles, for example 2-(2'-hydroxy-5'-methylphenyl)benzotriazole; 2-hydroxybenzophenones, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative; esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate; acrylates, for example ethyl or isooctyl α-cyano-β,β-diphenylacrylate, methyl α-carbomethoxycinnamate, methyl or butyl α-cyano-β-methyl-β-methoxycinnamate, methyl α-carbomethoxy-β-methoxycinnamate, N-(β-carbomethoxy-β-cyanovinyl)-2-methylindoline.

Examples of suitable polyamide stabilizers are copper salts in combination with iodides and/or phosphorus compounds, and salts of divalent manganese.

Suitable basic costabilizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony catecholate or tin catecholate.

Examples of suitable nucleating agents are 4-tert-butylbenzoic acid, adipic acid, and diphenylacetic acid.

Suitable further flame retardants are, for example, aryl phosphates, organic phosphonates, salts of hypophosphorous acid and red phosphorus.

Examples of other added substances include plasticizers, expandable graphite, emulsifiers, pigments, optical brighteners, flame retardants, antistats, blowing agents.

The abovementioned additives may be introduced into the polymer in a wide variety of different process steps. For instance, it is possible in the case of polyamides or polyesters, at the start or at the end of the polymerization/polycondensation or in a subsequent compounding operation, to mix the additives into the polymer melt. In addition, there are processing operations in which the additives are not added until a later stage. This is practised especially when using pigment or additive masterbatches. There is also the possibility of applying additives, particularly in powdered form, to the polymer pellets, which may be warm as a result of the drying operation, by drum application.

The flame retardant-stabilizer combination is preferably in the form of pellets, flakes, fine grains, powder and/or micronizate.

The flame retardant-stabilizer combination is preferably in the form of a physical mixture of the solids, of a melt mixture, of a compactate, of an extrudate, or in the form of a masterbatch.

The flame retardant-stabilizer combination preferably has an average particle size of 0.1-50 μm.

DEPAL and DEPTi in the mixture preferably have a particle size $D_{50}$ (% by volume, measured by means of laser diffraction in a Malvern Mastersizer 2000 particle size analyser instrument, in acetone) of ≤50 μm, more preferably of ≤25 μm.

The invention also provides moulding compounds of thermoplastic or thermoset polymers comprising the flame retardant mixtures according to the invention.

Zinc phosphite can be prepared, for example, in the following manner: To an initial charge of 8763.6 g of zinc sulfate heptahydrate and 736.2 g of demineralized water was added 5235.8 g of disodium phosphite solution (39.3%) within 2 h, and then 370 g of demineralized water. The resultant zinc phosphite was crystallized at 150° C. for 5 h. Subsequently, the slurry was discharged and filtered three times in a suction filter with five times the mass of demineralized water, and the filtercake was dried at 130° C. in a drying cabinet. This results in 2096 g of product (97% yield).

Zinc phosphites preferably have particle sizes of 0.1 to 100 μm and more preferably of 0.1 to 30 μm.

The polymer more preferably comprises polyamides and/or polyesters.

Suitable polyesters derive from dicarboxylic acids and esters thereof and diols and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

Suitable polystyrenes are polystyrene, poly(p-methylstyrene) and/or poly(alpha-methylstyrene).

The polymers are preferably polyamides and copolyamides which derive from diamines and dicarboxylic acids and/or from aminocarboxylic acids or the corresponding lactams, such as nylon-2,12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11, nylon-12, etc. These are known, for example, by the trade names Nylon®, from DuPont, Ultramid®, from BASF, Akulon® K122, from DSM, Zytel® 7301, from DuPont; Durethan® B 29, from Bayer and Grillamid®, from Ems Chemie.

Also suitable are aromatic polyamides proceeding from m-xylene, diamine and adipic acid; polyamides prepared from hexamethylenediamine and iso- and/or terephthalic acid and optionally an elastomer as a modifier, for example poly-2,4,4-trimethylhexamethyleneterephthalamide or poly-m-phenyleneisophthalamide, block copolymers of the aforementioned polyamides with polyolefins, olefin copolymers, ionomers or chemically bound or grafted elastomers, or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The polymers are preferably thermoplastic elastomers.

Thermoplastic elastomers (abbreviation: TPE) are materials which are thermoplastically processable and have rubber-like use properties.

Thermoplastic elastomers can be shaped very easily, since they pass through the plastic state in the course of processing. They can be produced in all hardnesses from 5 Shore A to more than 70 Shore D.

Thermoplastic elastomers have, in partial ranges, physical crosslinking points which break down with heating, without decomposition of the macromolecules. Therefore, they have much better processability than normal elastomers. Thus, the polymer wastes can also be melted again and processed further. According to the internal structure, a distinction is made between block copolymers and elastomer alloys.

Block copolymers have hard and soft segments within one molecule. The polymer thus consists of one type of molecule in which both properties are distributed.

Elastomer alloys are polyblends, i.e. mixtures (blends) of finished polymers, i.e. the polymer consists of two or more molecule types. Through different mixing ratios and additives, tailored materials are obtained (for example polyolefin elastomer formed from polypropylene (PP) and natural rubber (NR)—according to the ratio, they cover a wide hardness range).

A distinction is made between the following groups:
TPE-O or TPO=olefin-based thermoplastic elastomers, predominantly PP/EPDM, e.g. Santoprene® (AES/Monsanto)
TPE-V or TPV=crosslinked olefin-based thermoplastic elastomers, predominantly PP/EPDM, e.g. Sarlink® (DSM)
TPE-U or TPU=urethane-based thermoplastic elastomers, e.g. Desmopan® (Bayer)
TPE-E or TPC=thermoplastic copolyesters
TPE-S or TPS=styrene block copolymers (SBS, SEBS, SEPS, SEEPS and MBS), e.g. Septon® (Kuraray) or Thermolast® (Kraiburg TPE)
TPE-A or TPA=thermoplastic copolyamides, e.g. PEBAX® (Arkema)

Particularly preferred thermoplastic elastomers are thermoplastic copolyesters and thermoplastic copolyamides.

Copolyether esters that are suitable for the compositions according to the invention are polymers that are prepared by reacting a $C_2$-$C_6$ diol with aromatic diacid unit and a poly(alkylene oxide) diol.

Particularly preferred copolyether esters are selected from:
1. copolyether esters of butylenediol, terephthalate and PTMEG (polytetramethylene ether glycol);
2. copolyether esters of butylenediol, mixture of terephthalate and isophthalate, and PTMEG;
3. copolyether esters of butylenediol, terephthalate and poly(propylene oxide) diol;
4. copolyether esters of propylenediol, terephthalate and PTMEG; and
5. copolyether esters of propylenediol, terephthalate and poly(propylene oxide) diol.

Particular preference is given to a copolyether ester of butylenediol, terephthalate and PTMEG.

The invention finally also relates to a process for producing flame-retardant polymer shaped bodies, characterized in that inventive flame-retardant polymer moulding compounds are processed by injection moulding (for example injection-moulding machine of the Aarburg Allrounder type) and pressing, foam injection moulding, internal gas-pressure injection moulding, blow moulding, film casting, calendering, laminating or coating at elevated temperatures to give the flame-retardant polymer shaped body.

The compositions according to the invention achieve a good combination of low flammability and reduced evolution of smoke.

The testing of smoke density can be conducted according to test standard ISO 5659 in an NBS smoke chamber. The specimens are produced as sheets having an area of 75 mm×75 mm and a thickness of 2 mm. The specimens are mounted horizontally in the chamber and exposed on their top side to a constant heat flow of 25 kW/m$^2$ via a cooler cone and a heat flow meter and in the presence of an ignition flame for a period of about 40 min. The smoke formed over the course of time is collected in the chamber, and the attenuation of a light beam passing through the smoke is measured with a photometric system comprising a 6.5 V incandescent lamp, a photomultiplier tube and a high-accuracy photodetector. The results are measured as transparency over time and reported as the specific optical density Ds. This is inversely proportional to transparency and is reported for a particular path length corresponding to the thickness of the shaped sample. The evolution of smoke is reported as the maximum specific optical density, Ds, max. Each droplet from the plaque test specimen that occurs during the test is recorded. Low values of Ds, max are desirable and indicate material that impairs vision in the event of fire to a lesser degree and hence enables rapid escape of personnel from tight spaces. Without smoke, transparency is 100% and Ds is 0.

1. Components Used
Thermoplastic polymers
polybutylene terephthalate (PBT): Ultradur® 4500 BASF
Nylon-6,6: Ultramid® A27, BASF
Nylon-6T/6,6: Arlen 3000, Mitsui
Thermoplastic copolyester: a copolyether ester elastomer comprising polytetramethylene oxide and polybutylene terephthalate as polyester block segments
Component A:
aluminium salt of diethylphosphinic acid, referred to hereinafter as DEPAL zinc salt of diethylphosphinic acid, referred to hereinafter as DEPZN
Component B:
titanium salt of diethylphosphinic acid, referred to hereinafter as DEPTI DEPTI is prepared as described in EP 1 479 718 B1 from diethylphosphinic acid and titanium tetrabutoxide according to example 1.
Component C:
Aluminium phosphite, referred to hereinafter as PHOPAL, and zinc phosphite, prepared as described above, referred to hereinafter as PHOPZN
Component D:
Melapur® MC 50 (melamine cyanurate), from BASF, referred to as MC
Melapur® 200/70 (melamine polyphosphate=MPP), BASF, referred to as MPP
Delflam® 20 (melem), Delamin, UK, referred to as melem
Component E:
PPG HP 3610 EC 10 4.5 mm glass fibres, for polyamides
PPG HP 3786 EC 10 4.5 mm glass fibres, for PBT, both from Nippon Electric Glass, NL
Component F:
Irganox® 1010 (pentaerythritol tetrakis(3-(3,5-di-tert-butyl-4-hydroxyphenyl)propionate), from BASF, referred to as sterically hindered phenol Irganox® 1330 (3,3',3',5,5',5'-hexa-tert-butyl-a,a',a'-(mesitylene-2,4,6-triyl)tri-p-cresol), from BASF, referred to as sterically hindered phenol Irganox® 245 ethylenebis(oxyethylene) bis(3-(5-tert-butyl-4-hydroxy-m-tolyl)propionate), referred to as sterically hindered phenol
Component G:
Lubricant: Licowax® E, montan wax, from Clariant, CH 2. Production, Processing and Testing of Flame-Retardant Polyester and Polyamide Compounds The flame-retardant components were mixed with the polymer pellets and any additives in the ratio specified in the tables and incorporated in a twin-screw extruder (Leistritz ZSE 27/HP-44D) at temperatures of 240 to 280° C. The homogenized polymer strand was drawn off, cooled in a water bath, and then pelletized.

After sufficient drying, the moulding compounds are processed in an injection moulding machine (Arburg 320C/KT) at melt temperatures of 260 to 280° C. to give test specimens. The flame retardancy of the moulding compounds was tested by method UL94V (Underwriters Laboratories Inc. Standard of Safety, "Test for Flammability of Plastic Materials for Parts in Devices and Appliances", page 14 to page 18, Northbrook 1998).

The fire tests were conducted by the UL 94 vertical test. The UL 94 fire classifications are as follows:
- V-0: afterflame time never longer than 10 sec, total of afterflame times for 10 flame applications not more than 50 sec, no flaming drops, no complete consumption of the specimen, afterglow time for specimens never longer than 30 sec after end of flame application
- V-1: afterflame time never longer than 30 sec after end of flame application, total of afterflame times for 10 flame applications not more than 250 sec, afterglow time for specimens never longer than 60 sec after end of flame application, other criteria as for V-0
- V-2: cotton indicator ignited by flaming drops, other criteria as for V-1

Not classifiable (n.c.): does not comply with fire classification V-2.

The examples report the afterflame time for 10 flame applications to 5 test specimens.

D Smoke Density

Optical smoke gas density was determined according to standard ISO 5659 in an NBS smoke chamber from Fire Testing Technologies, UK. Specimens produced by injection moulding with dimensions of 75 mm×75 mm and a thickness of 2 mm. The specimens were clamped horizontally and irradiated with 25 kW/m$^2$ in the presence of a pilot flame for 40 min. The attenuation of a light beam by the smoke is measured with a photodetector. Smoke gas density is inversely proportional to the attenuation of light.

Tensile properties were determined with a Z 010 tensile tester (from Zwick) according to DIN EN ISO 527-1/-2/-3. The method is used in order to examine the tensile deformation characteristics of test specimens and to ascertain the tensile strength, tensile modulus and other features of the tensile stress/strain relationship under fixed conditions. The test specimens are preferably produced by injection moulding. The number of test specimens is guided by the tests required For the sample preparation, the test specimens are stored at 23° C./50% rel. humidity in a climate-controlled room for at least 16 h. Polyamide test specimens and other strongly water-absorbing test specimens must be stored in an airtight sealed bag.

The flowability of the moulding compounds was determined by establishing the melt volume flow rate (MVR) at 275° C./2.16 kg. A sharp rise in the MVR value indicates polymer degradation.

TABLE 1

PBT GF 30: V1-V3 are comparative examples; B1 to B6 are inventive examples

| | V1 | V2 | V3 | V4 | B1 | B2 | B3 | B4 | B5 | B6 |
|---|---|---|---|---|---|---|---|---|---|---|
| PBT | 49.4 | 59.4 | 59.4 | 59.4 | 59.4 | 59.4 | 59.4 | 59.4 | 59.4 | 59.4 |
| Glass fibres | 30 | 30 | 30 | 39 | 30 | 30 | 30 | 30 | 30 | 30 |
| DepAl | 20 | 10 | | | 2.5 | 5 | 7.5 | | | |
| DepZn | | | | 10 | | | | 2.5 | 5 | 7.5 |
| DepTi | | | 10 | | 7.5 | 5 | 2.5 | 7.5 | 5 | 2.5 |
| Licowax E | 0.3 | 0.3 | 0.3 | 0.3 | 0.3 | 0.3 | 0.3 | 0.3 | 0.3 | 0.3 |
| Irganox ® 1010 | 0.3 | 0.3 | 0.3 | 0.3 | 0.3 | 0.3 | 0.3 | 0.3 | 0.3 | 0.3 |
| UL94 1.6 mm | V-0 | V-2 | V-1 | n.c. | V-0 | V-0 | V-0 | V-0 | V-0 | V-0 |
| AFT/s | 35- | 47- | 54 | 180 | 12 | 15 | 33 | 39 | 47 | 45 |
| Cottonwool burns | | yes | | | | | | | | |
| LOI | 36 | 33 | 38 | 27 | 41 | 42 | 39 | 40 | 39 | 33 |
| Ds, max | 597 | 548 | 523 | 625 | 435 | 354 | 378 | 432 | 412 | 489 |

Table 1 shows that particularly the combination of DepAl or DepZn and DepTi, even at a dosage of 10% flame retardant, attains the UL 94 V-0 fire class. In addition, the combination of DepAl and DepTi achieves a low smoke gas density Ds.

TABLE 2

Nylon-6,6 GF 30

| | V5 | V6 | V7 | V8 | B7 | B8 | B9 | B10 | B11 | B12 |
|---|---|---|---|---|---|---|---|---|---|---|
| PA 66 | 57.7 | 49.7 | 54.7 | 49.7 | 54.7 | 54.7 | 54.7 | 54.7 | 54.7 | 54.7 |
| Glass fibres | 30 | 30 | 30 | 30 | 30 | 30 | 30 | 30 | 30 | 30 |
| DepAl | 12 | 20 | | | 5 | 7.5 | 10 | | 5 | 7.5 |
| DepTi | | | 15 | 20 | 10 | 7.5 | 5 | 10 | 5 | 2.5 |
| MPP | | | | | | | | 5 | 5 | 5 |
| Licowax E | 0.3 | 0.3 | 0.3 | 0.3 | 0.3 | 0.3 | 0.3 | 0.3 | 0.3 | 0.3 |
| UL 94 1.6 mm | n.c. | n.c. | V-1 | V-0 | V-0 | V-0 | V-1 | V-1 | V-0 | V-0 |
| AFT/s | 165 | 123 | 67 | 33 | 12 | 15 | 54 | 55 | 39 | 32 |

Table 2 shows that the combination of DepAl and DepTi achieves the UL 94 V-0 fire class even at a dosage of 15% flame retardant; in a combination with MPP, likewise only 15% flame retardant is needed.

TABLE 3

Nylon-6T/66 GF 30

| | V9 | V10 | V11 | B13 | B14 | B15 | B16 |
|---|---|---|---|---|---|---|---|
| PA 6T/66 | 54.7 | 59.7 | 59.7 | 59.7 | 49.7 | 59.7 | 57.7 |
| Glass fibres | 30 | 30 | 30 | 30 | 30 | 30 | 30 |
| DepAl | 15 | 10 | | 2.5 | 5 | 7.5 | 4 |
| DepTi | | | 10 | 7.5 | 5 | 2.5 | 4 |
| Licowax E | 0.3 | 0.3 | 0.3 | 0.3 | 0.3 | 0.3 | 0.3 |
| | | | | | | | 4 |
| UL 94 1.6 mm | V-0 | V-2 | V-1 | V-0 | V-0 | V-0 | V-0 |
| AFT/s | 34 | 56 | 55 | 23 | 30 | 43 | 23 |

Table 3 shows that the combination of DepAl and DepTi achieves the UL 94 V-0 fire class even at a dosage of 10% flame retardant; in a combination with melem, only 12% flame retardant is needed.

Table 4 shows how the addition of zinc phosphate and aluminium phosphite reduces the smoke gas density of nylon-6,6 with aluminium diethylphosphinate and titanium diethylphosphinate. Only the use of aluminium diethylphosphinate and titanium diethylphosphinate together with PHOPZN and/or PHOPAL achieves the UL 94 V-0 fire class together with a low smoke gas density.

TABLE 4

PA 6,6 GF 30 test results. V12-V14 are comparative examples; B17 to B20 are flame retardant-stabilizer mixtures according to the invention

| | V12 | V13 | V14 | B17 | B18 | B19 | B20 |
|---|---|---|---|---|---|---|---|
| Nylon-6,6 | 50 | 50 | 50 | 55 | 55 | 55 | 55 |
| 3610 glass fibres | 30 | 30 | 30 | 30 | 30 | 30 | 30 |
| DEPAL | 13 | 15 | | 7.5 | 7 | 7 | 5 |
| DEPTI | | | 20 | 7.5 | 7 | 7 | 5 |
| PHOPAL | | 5 | | | | 1 | 1 |
| PHOPZN | | | | | 1 | | |
| MPP | 7 | | | | | | 5 |
| UL 94 0.8 mm | V-0 | V-0 | V-0 | V-0 | V-0 | V-0 | V-0 |
| smoke gas density | high | high | high | average | low | low | low |

TABLE 5

PA 6,6 GF 30 test results. V2 to V4 are comparative examples; B12 to B15 are flame retardant-stabilizer mixture according to the invention

| | V15 | V16 | B21 | B22 | B23 | B24 |
|---|---|---|---|---|---|---|
| Nylon-6,6 | 49.55 | 49.55 | 49.55 | 49.55 | 49.55 | 52.55 |
| 3610 glass fibres | 30 | 30 | 30 | 30 | 30 | 30 |
| DEPAL | 20 | 15 | 5 | 7 | 5 | 7 |
| DEPTI | | | 10 | 7 | 5 | 7 |
| PHOPZN | | 2 | 2 | 3 | 2.5 | |
| PHOPAL | | | | 3 | 2.5 | 3 |
| MPP | | 3 | 3 | | | 5 |
| Licowax E | 0.25 | 0.25 | 0.25 | 0.25 | 0.25 | 0.25 |
| 168/1098 1:1 | 0.20 | 0.20 | 0.20 | 0.20 | 0.20 | 0.20 |
| UL 94 0.8 mm | V-1 | V-0 | V-1 | V-0 | V-0 | V-0 |
| MVR 275° C./ 2.16 kg | 10 | 18 | 12 | 5 | 12 | 6 |

TABLE 5-continued

PA 6,6 GF 30 test results. V2 to V4 are comparative examples; B12 to B15 are flame retardant-stabilizer mixture according to the invention

| | V15 | V16 | B21 | B22 | B23 | B24 |
|---|---|---|---|---|---|---|
| CTI/V | 550 | 575 | 600 | 600 | 600 | 600 |
| smoke gas density | high | average | low | low | low | low |

Table 5 shows comparative examples V15 and V16 in which a flame retardant-stabilizer combination based on aluminium diethylphosphinate with MPP and PHOPZN was used.

The results in which the flame retardant-stabilizer mixture according to the invention was used are listed in examples B21 to B24. All amounts are reported as % by weight and are based on the polymer moulding compound including the flame retardant-stabilizer combination and additives.

Table 6 shows the results in a thermoplastic copolyester. Only the inventive combination of Depal with Depti and the phosphites can achieve a high LOI coupled with simultaneously low smoke gas density Ds, max.

TABLE 6

Thermoplastic polyester copolymer (TPE-E). V17-V19 are comparative examples; B25 to B28 are flame retardant-stabilizer mixtures according to the invention

| | V17 [%] | V18 [%] | B25 [%] | B26 [%] | V19 [%] | B27 [%] | B28 [%] |
|---|---|---|---|---|---|---|---|
| | 85 | 80 | 80 | 77.5 | 85 | 81.5 | 72 |
| DEPAL | | 20 | 10 | 10 | 10 | 8 | 10 |
| DEPTI | 15 | | 10 | 10 | | 8 | 10 |
| PHOPAL | | | | 2.5 | 5 | | 4 |
| PHOPZN | | | | | | 2.5 | 4 |
| LOI | 21 | 29 | 40 | 38 | 24 | 36 | 37 |
| | 529 | 694 | 538 | 465 | 505 | 401 | 463 |

It is apparent from examples B21-B24 that the mixture according to the invention of the aluminium diethylphosphinate and titanium diethylphosphinate components, and also PHOPZN and/or PHOPAL and optionally MPP, achieves UL 94 V-0 fire class, low MVR (little polymer degradation) and low optical smoke gas density.

Furthermore, the polyamides with the flame retardant-stabilizer combinations according to the invention have good melt stability, high impact resistances and tensile strengths, good thermal ageing properties, low exudation and CTI values of 600 V or higher.

The invention claimed is:

1. A flame retardant-stabilizer mixture comprising
    as a component A, 5% to 95% by weight of aluminium diethylphosphinate (DEPAL) and/or zinc diethylphosphinate (DEPZN),
    as a component B, 5% to 95% by weight of titanium phosphinates and/or titanyl phosphinates of the formula (I) (DEPTI)

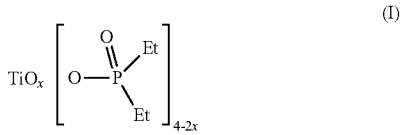

in which x is a number from 0 to 1.9, as a component C, 0% to 10% by weight of zinc phosphite of the formulae (II) or aluminum phosphite of the formulae (III)

$$[HP(=O)O_2]^{2-}Zn^{2+} \quad (II)$$

$$[HP(=O)O_2]^{2-}{}_3Al^{3+}{}_2, \quad (III)$$

as a component D, 0% to 30% by weight of a nitrogen-containing synergist; of a phosphorus-containing flame retardant; a nitrogen-containing flame retardant; a flame retardant containing phosphorus and nitrogen; or any combination of these, as a component E, 0% to 70% by weight of a filler and reinforcer, as a component F, 0% to 3% by weight of an organic phosphonite, an organic phosphite, a phenolic antioxidant, or mixtures thereof, and as a component G, 0% to 3% by weight of an ester and/or a salt of a long-chain aliphatic carboxylic acid with a chain length of $C_{14}$ to $C_{40}$, wherein
the sum total of the components is always 100% by weight, and
component A and component B are present in a weight-to-weight ratio of from 1:3 to 3:1.

2. The flame retardant-stabilizer mixture according to claim 1, wherein the mixture comprises

| | |
|---|---|
| 10% to 68.8% | by weight of component A, |
| 10% to 40% | by weight of component B, |
| 20% to 50% | by weight of component E, |
| 0.1% to 3% | by weight of component F, and |
| 0.1% to 2% | by weight of component G, | wherein
the sum total of the components is always 100% by weight and
component A and component B are present in a weight-to-weight ratio of from 1:3 to 3:1.

3. The flame retardant-stabilizer mixture according to claim 1, wherein the mixture comprises

| | |
|---|---|
| 10% to 68.9% | by weight of component A, |
| 10% to 40% | by weight of component B, |
| 1% to 30% | by weight of component D, |
| 20% to 50% | by weight of component E, and |
| 0.1% to 2% | by weight of component G, | wherein
the sum total of the components is always 100% by weight, and
component A and component B are present in a weight-to-weight ratio of from 1:3 to 3:1.

4. The flame retardant-stabilizer mixture according to claim 1, wherein x in formula (I) is 1 to 1.05.

5. The flame retardant-stabilizer mixture according to claim 1, wherein component C comprises zinc phosphite, secondary zinc phosphite ($ZnHPO_3$), $Zn(H_2PO_3)_2$, $Zn_{2/3}HPO_3$, zinc phosphite hydrates, zinc pyrophosphite ($ZnH_2P_2O_5$), basic zinc phosphite of the formula $Zn_{1+x}HPO_3(OH)_{2x}$ with x=0 to 0.25 and/or sodium zinc phosphite of the formula $Zn_{1-x}Na_{2x}HPO_4$ with x=0.001 to 0.5.

6. The flame retardant-stabilizer mixture according to claim 1, wherein component C comprises aluminium phosphite [$Al(H_2PO_3)_3$], secondary aluminium phosphite [$Al_2(HPO_3)_3$], basic aluminium phosphite [$Al(OH)(H_2PO_3)_2*2aq$], aluminium phosphite tetrahydrate [$Al_2(HPO_3)_3*4aq$], aluminium phosphonate, $Al_7(HPO_3)_9(OH)_6$(hexane-1,6-diamine)$_{1.5}*12H_2O$, $Al_2(HPO_3)_3*xAl_2O_3*nH_2O$ where x=2.27-1 and/or $Al_4H_6P_{16}O_{18}$, and comprises aluminium phosphites of the formulae (IV), (V) and/or (VI)

$$Al_2(HPO_3)_3 \times (H_2O)_q \quad (IV)$$

in which

| | |
|---|---|
| q | is 0 to 4, |

$$Al_{2.00}M_z(HPO_3)_y(OH)_v \times (H_2O)_w \quad (V)$$

in which

| | |
|---|---|
| M | represents alkali metal ions |
| z | is 0.01 to 1.5 |
| y | is 2.63 to 3.5 |
| v | is 0 to 2, and |
| w | is 0 to 4, |

$$Al_{2.00}(HPO_3)_u(H_2PO_3)_t \times (H_2O)_s \quad (VI)$$

in which

| | |
|---|---|
| u | is 2 to 2.99, |
| t | is 2 to 0.01, and |
| s | is 0 to 4, | and/or comprises mixtures of aluminium phosphite of the formula (IV) with sparingly soluble aluminium salts and nitrogen-free extraneous ions, mixtures of aluminium phosphite of the formula (VI) with aluminium salts, aluminium phosphite [$Al(H_2PO_3)_3$], secondary aluminium phosphite [$Al_2(HPO_3)_3$], basic aluminium phosphite [$Al(OH)(H_2PO_3)_2*2aq$], aluminium phosphite tetrahydrate [$Al_2(HPO_3)_3*4aq$], aluminium phosphonate, $Al_7(HPO_3)_9(OH)_6$(hexane-1,6-diamine)$_{1.5}*12H_2O$, $Al_2(HPO_3)_3*xAl_2O_3*nH_2O$ with x=2.27-1, and/or $Al_4H_6P_{16}O_{18}$.

7. The flame retardant-stabilizer mixture according to claim 1, wherein component D comprises
condensation products of melamine,
reaction products of melamine with polyphosphoric acid,
reaction products of condensation products of melamine with polyphosphoric acid,
melamine cyanurate, or
any combination of these.

8. The flame retardant-stabilizer mixture according to claim 7, wherein component D comprises melem, melam, melon, dimelamine pyrophosphate, melamine polyphosphate, melem polyphosphate, melam polyphosphate, melon polyphosphate, and/or mixed poly salts thereof.

9. A flame retardant clearcoat, intumescent coating, wood or other cellulosic product, polymer, polymer moulding, polyester, pure or blended cellulose fabric, or synergist comprising the mixture according to claim 1.

10. A flame-retardant thermoplastic or thermoset polymer moulding compound or polymer moulding, film, filament, and/or fibre comprising
    2% to 50% by weight of the flame retardant-stabilizer mixture according to claim 1,
    50% to 98% by weight of thermoplastic or thermoset polymer or mixtures thereof,
    0% to 50% by weight of additives, and
    0% to 60% by weight of filler or reinforcing materials, where the sum of the components is 100% by weight.

11. A flame-retardant thermoplastic or thermoset polymer moulding compound or polymer moulding, film, filament, and/or fibre comprising
    7% to 30% by weight of the flame retardant-stabilizer mixture according to claim 1,
    30% to 92% by weight of thermoplastic or thermoset polymer or mixtures thereof,
    1% to 30% by weight of additives, and
    0% to 40% by weight of filler or reinforcing materials, where the sum of the components is 100% by weight.

12. A flame-retardant thermoplastic or thermoset polymer moulding compound or polymer moulding, film, filament, and/or fibre comprising the flame retardant-stabilizer mixture according to claim 1, wherein the polymer moulding compound or polymer moulding, film, filament, and/or fibre comprises thermoplastic polymers of high-impact polystyrene, polyphenylene ether, polyamide, polyesters or polycarbonate, and blends or polymer blends of acrylonitrile-butadiene-styrene, polyphenylene ether/high-impact polystyrene, or polycarbonate/acrylonitrile-butadiene.

13. A flame-retardant thermoplastic or thermoset polymer moulding compound or polymer moulding, film, filament, and/or fibre comprising the flame retardant-stabilizer mixture according to claim 1, wherein the polymer comprises
    thermoplastic polymers of nylon-6 or nylon-6,6,
    semiaromatic polyamides, and
    polyesters of polybutylene terephthalate, polycyclohexylenedimethylene terephthalate, and/or polyethylene terephthalate.

14. A flame-retardant thermoplastic or thermoset polymer moulding compound or polymer moulding, film, filament, and/or fibre according to claim 10, wherein the additives are antioxidants, UV absorbers, light stabilizers, metal deactivators, peroxide-destroying compounds, polyamide stabilizers, basic costabilizers, nucleating agents, further flame retardants, or mixtures of these.

15. A flame-retardant thermoplastic or thermoset polymer moulding compound or polymer moulding, film, filament, and/or fibre according to claim 10, wherein component E comprises fillers and reinforcers selected from calcium carbonate, silicates, glass fibres, asbestos, talc, kaolin, mica, barium sulfate, metal oxides and hydroxides, carbon black, and mixtures of these.

16. An article comprising the flame-retardant thermoplastic or thermoset polymer moulding compound or polymer moulding, film, filament, and/or fibre of claim 10, wherein the article is a flame-retardant plug connector, a current-bearing component in a power distributor, a circuit board, a potting compound, a power connector, a circuit breaker, a lamp housing, an LED lamp housing, a capacitor housing, a coil element, a ventilator, a grounding contact, a plug, a printed circuit board, a housing for a plug, a cable, a flexible circuit board, a charging cable, a motor cover, or a textile coating.

17. The flame retardant-stabilizer mixture according to claim 1, wherein the mixture comprises:

| | |
|---|---|
| 5% to 95% | by weight of component A, |
| 5% to 95% | by weight of component B, |
| 0% to 10% | by weight of component C, |
| 0% to 20% | by weight of component D, |
| 20% to 60% | by weight of component E, |
| 0% to 3% | by weight of component F, and |
| 0% to 2% | by weight of component G, | wherein
    the sum total of the components is always 100% by weight, and
    component A and component B are present in a weight-to-weight ratio of from 1:3 to 3:1.

18. A flame retardant-stabilizer mixture comprising:
as a component A, 10% to 69% by weight of aluminium diethylphosphinate (DEPAL) and/or zinc diethylphosphinate (DEPZN),
as a component B, 10% to 69% by weight of titanium phosphinates and/or titanyl phosphinates of the formula (I) (DEPTI)

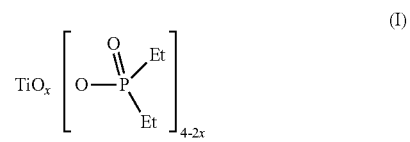

in which x is a number from 0 to 1.9,
as a component C, 1% to 20% by weight of zinc phosphite of the formulae (II) or aluminum phosphite of the formulae (III)

as a component D, 0% to 30% by weight of a nitrogen-containing synergist; a phosphorus-containing flame retardant; a nitrogen-containing flame retardant; a flame retardant containing phosphorus and nitrogen; or any combination thereof,
as a component E, 20% to 50% by weight of a filler and reinforcer,
as a component F, 0% to 3% by weight of an organic phosphonite, an organic phosphite, a phenolic antioxidant, or mixtures thereof, and
as a component G, 0% to 2% by weight of an ester and/or a salt of a long-chain aliphatic carboxylic acid with a chain length of $C_{14}$ to $C_{40}$,
wherein
    the sum total of the components is always 100% by weight, and
    component A and component B are present in a weight-to-weight ratio of from 1:3 to 3:1.

19. The flame retardant-stabilizer mixture according to claim 18, wherein the mixture comprises:

| | | |
|---|---|---|
| 10% to 69% | by weight of component A, | |
| 10% to 69% | by weight of component B, | |
| 1% to 20% | by weight of component C, | |
| 0% to 30% | by weight of component D, and | |
| 20% to 50% | by weight of component E, | | wherein
   the sum total of the components is always 100% by weight, and
   component A and component B are present in a weight-to-weight ratio of from 1:3 to 3:1.

\* \* \* \* \*